United States Patent [19]
Gerstle

[11] 3,834,013
[45] Sept. 10, 1974

[54] METHOD FOR FORMING FINISHED BORE SIZES IN LAMINATED STATOR CORES OF DYNAMOELECTRIC MACHINES

[75] Inventor: De Witt F. Gerstle, Dayton, Ohio

[73] Assignee: General Motors Corporation, Detroit, Mich.

[22] Filed: Feb. 18, 1971

[21] Appl. No.: 116,404

[52] U.S. Cl............ 29/596, 29/423, 29/609, 72/364, 72/370, 148/130
[51] Int. Cl............ H02k 15/00
[58] Field of Search............ 29/596, 609, 205 D; 310/216; 72/364, 370; 148/130

[56] References Cited
UNITED STATES PATENTS

| | | | |
|---|---|---|---|
| 2,304,607 | 12/1942 | Sleeter | 29/609 X |
| 3,202,851 | 8/1965 | Zimmerle et al. | 29/596 X |
| 3,383,900 | 5/1968 | Hartesveldt | 72/364 X |
| 3,568,303 | 3/1971 | Ito et al. | 72/370 X |

Primary Examiner—C. W. Lanham
Assistant Examiner—Carl E. Hall
Attorney, Agent, or Firm—Richard G. Stahr

[57] ABSTRACT

In a preferred method for forming finished bore sizes in laminated stator cores, a heat expandable cylindrical fixture is mounted in an out-of-round bore initially formed in a stack of stator laminations. The fixture and the stack of stator laminations are heated to an elevated temperature so that the fixture is thermally expanded against the sides of the bore. Radial force developed by the heated fixture deforms the bore sides into conformity with the expanded circumference of the fixture. When the stack of stator laminations is cooled to ambient temperatures, a desired stator bore size is provided therein having a finished circular configuration formed to closely controlled dimensional tolerances.

4 Claims, 8 Drawing Figures

PATENTED SEP 10 1974 3,834,013

INVENTOR.
DeWitt F. Gerstle
BY
L. Warren Smith
ATTORNEY

METHOD FOR FORMING FINISHED BORE SIZES IN LAMINATED STATOR CORES OF DYNAMOELECTRIC MACHINES

This invention relates to the manufacture of stator cores of dynamoelectric machines and more particularly to an improved method for forming finished bore sizes in laminated stator cores utilizing a heat expandable fixture.

Dynamoelectric machines generally include a stationary part or stator that typically includes a magnetizable core formed by a stack of stator laminations. The stator laminations are punched out of a strip of sheet metal material. A series of die stamping operations cut a center hole, the outer lamination sides, and pierce a circumferential series of radially extending slots around the center hole. These slots are spaced apart by teeth having tips which define the center opening of each stator lamination. When the stator laminations are axially aligned in stacks to form the stator cores, the lamination center openings are mutually aligned to define an initially formed stator bore. The stator bore is finished to a predetermined size for receiving the rotary part or rotor of the dynamoelectric machine. The radial spacing between the rotor and the stator bore defines an air gap through which the rotor and stator magnetic fields are directed for producing the desired electrodynamic operation of the machine.

There is an increasing interest in developing the maximum outputs from dynamoelectric machines of given sizes and one manner of improving efficiency is to reduce the magnetic losses in the air gaps of the machines. These air gap losses can be reduced by reducing the radial space between the stator bore and the rotor. Accordingly, the size and configuration of the stator bores must be kept within close tolerances so that the rotors can be mounted therein with a minimum of radial clearance.

Manufacture of laminated stator cores involves careful performance of a number of manufacturing steps that can effect the size and configuration of the stator bores. Initially, the series of die stamping operations are carefully controlled during blanking of the stator laminations from the sheet metal strip. The stator laminations are then carefully stacked in axial registration on an arbor and then fastened together to form the stator core. This maintains the center openings of the stator laminations in mutually concentrically aligned relationship. The stator bores are then further processed by manufacturing steps including machining, heat treating and insulating the core surfaces. When the stator core is finished, windings are then assembled to the axial slots formed by the aligned lamination slots.

In many instances, even through the stamping dies used for forming the stator laminations are held to close tolerances and extreme care is taken during each of the manufacturing steps, the stator bores are found to have finished dimensions that are not within the desired tolerances for minimum air gap spacing. The bore diameter dimensions often varying around the bore so that the stator bores are substantially out-of-round after they are initially formed. It has been observed that with the center openings in the stator laminations being held to critical circular dimensions while in the sheet metal strip, they frequently become out-of-round after separation from the sheet metal strip. This prevents the initially formed out-of-round bore from being held to close tolerances so that more than light burnishing or dressing of the bore sides is required to finish the stator bores for accurate and close radial spacing with a rotor.

In the past, several techniques were known for finishing stator bores. As described in U.S. Pat. No. 2,304,607, Sleeter, issued Dec. 8, 1942, and assigned to the assignee of this invention, a broaching tool is used to correct any irregular margins at the tips of the stator teeth along the stator bore. It has been found in using this technique, that broaching is not always successful for producing substantial bore dimensional changes. Substantial boraching causes separation of the stator laminations. Also, there is bending and distortion at the tips of the teeth defining the bore. Substantial broaching has also been found to produce an undesired axial taper in the stator bore.

Other known techniques for sizing and finishing stator bores include rolling and burnishing which are chiefly used for straightening and finishing the tips of the stator teeth. However, little dimensional change is afforded by these techniques. Reforming of stator bores has also been attempted by others machining and grinding techniques, however, the desired accuracy and costs consistent with mass production techniques have not been found generally satisfactory.

In the present invention, a heat expandable cylindrical fixture correctly sizes an out-of-round stator bore initially formed in a stack of stator laminations. The cylindrical fixture is made of a high strength metal having a thermal expansion characteristic substantially higher than that of the sheet metal material of the stator laminations. Also, the strength of the cylindrical fixture is substantially higher at elevated temperatures than that of the material of the stator laminations. The outer circumference of the fixture has a predetermined circular size for insertion into the initially formed stator bore. The stack of stator laminations and the fixture are heated in a furnace to elevated temperatures. The outer circumference of the fixture expands substantially more than does the stator bore. The increased diameter of the fixture presses radially against the stator teeth due to tis higher strength to develop high stresses in the stator laminations. These stresses exceed the elastic limit in the lamination material and plastic deformation occurs along the sides of the stator bore so that the tips of the teeth are pressed into conformity with the expanded circumference of the fixture. This reforms the initially formed stator bore to a predetermined size having a high degree of circularity when measured along circumferentially spaced bore diametrical axes. An advantageous feature of the present method is that it can be carried out concurrently during normal stator core heat treating steps.

It is an important object of this invention to provide a method for forming a finished stator bore size in a stack of stator laminations having substantially reduced bore size variations without the use of internal cutting, grinding or machining apparatus by utilizing a heat expandable cylindrical fixture which presses the stator bore into a predetermined circular size.

Another object of this invention is to provide a method for forming out-of-round center openings of stator laminations defined by the tips of circumferentially spaced stator teeth wherein a heat expandable cylindrical fixture made of a stainless steel material and having an outer circumference of a predetermined diameter is mounted in an initially formed out-of-round stator bore defined by the center openings of the laminations, and further wherein the fixture and the stack of stator laminations are heated to an elevated temperature so that the circumference of the fixture thermally expands to develop desired stresses in the areas of stator laminations adjacent the stator bore whereby permanent deformation produces a desired finished bore size and roundness for manufacture of dynamoelectric machines having controlled minimum air gap spacings.

Further objects and advantages of the present invention will be apparent from the following description, reference being had to the accompanying drawings wherein a preferred embodiment of the present invention is clearly shown.

IN THE DRAWINGS

Figure 6:
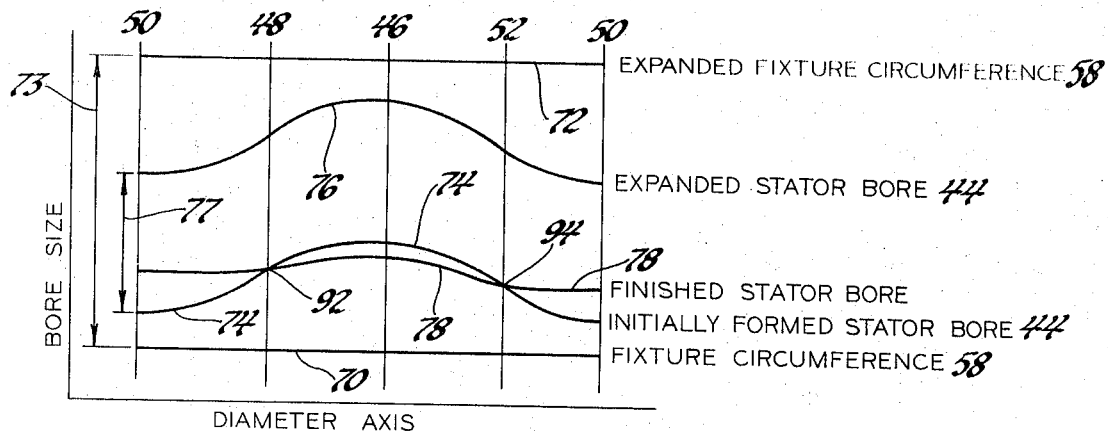

FIG. 6 graphically illustrates the difference in sizes of the stator bore and the heat expandable cylindrical fixture at ambient and elevated temperatures versus circumferentially spaced diametrical axes.

Figure 7:
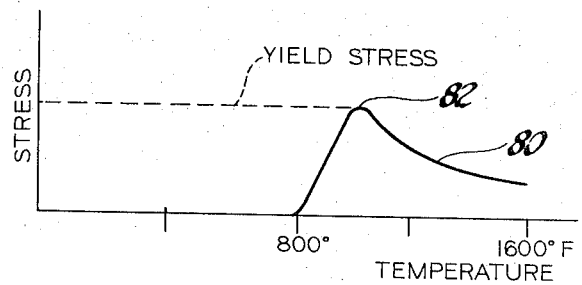

FIG. 7 graphically illustrates stresses developed in the stator laminations by the heat expandable cylindrical fixture versus temperature.

Figure 8:
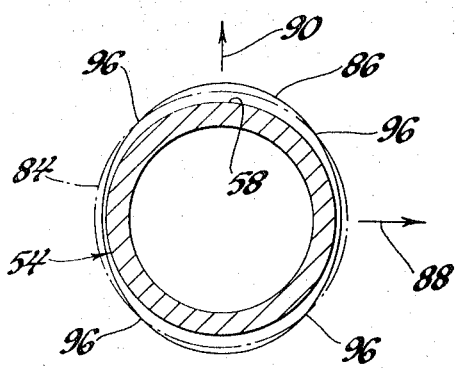

FIG. 8 illustrates schematic outlines of a stator bore before and after the bore sizing steps performed in accordance with the present invention.

Figure 1:
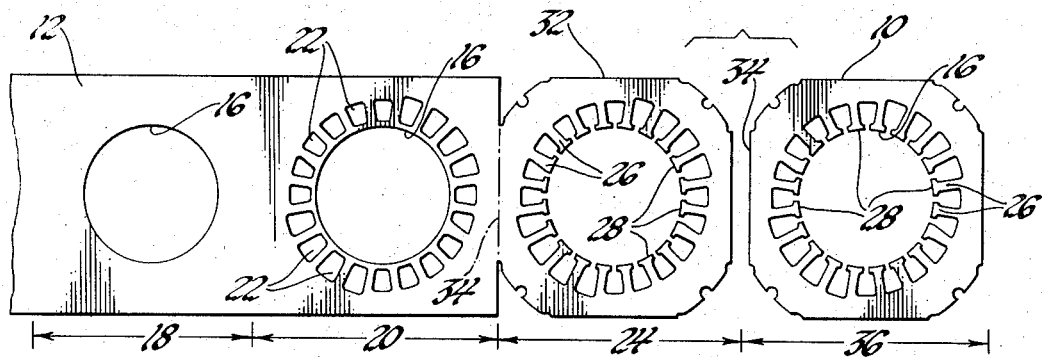
FIG. 1 illustrates the final die stamping operations for forming stator laminations from a strip of sheet metal material.

Referring now to the drawing and more particularly to FIG. 1 wherein is illustrated the final die stamping operations for forming a stator lamination 10 from a strip 12 of sheet metal material. The sheet metal strip 12 is continuously fed from rolls to a series of stamping stations of a suitable stamping machine. In one specific embodiment, the material of the sheet metal strip 12 comprises a full-hard silicon lamination steel generally corresponding to the American Iron and Steel Institute (A.I.S.I.) specification M45. When properly annealed this material has suitable magnetization characteristics for use in magnetizable stator and rotor core assemblies of dynamoelectric machines. The thickness of the sheet metal strip 12 is in the order of 0.0250 inch which is provided by a mill rolling process prior to winding the strip into a roll.

The sheet metal strip 12 passes under a series of progressive dies which pierce the sheet metal material in a manner substantially similar to that described in U.S. Pat. No. 3,202,851, Zimmerle et al., issued Aug. 24, 1965, and assigned to the assignee of this invention. As the die stamping operation progresses, a center hole 16 is blanked at a station 18. This provides a circular cutout, not shown, used to form rotor laminations. These rotor laminations are formed with radial slots, stacked and fastened together to form a rotor core which does not form a part of this invention. One example of forming rotor cores is described in U.S. Pat. No. 3,110,831, Zimmerle, issued Nov. 12, 1963, and assigned to the assignee of this invention.

At a further station 20, a plurality of radial slots 22 are punched out adjacent the center hole 16. The slots 22 are formed by progressive dies and can include various configurations. At the next station 24 openings to the slot are provided so as to define a series of circumferentially spaced teeth 26. The ends of the teeth 26 terminate at tooth tips 28 extending in a circular arc. The tooth tips 28 are trimmed in a shaving operation to form the initial size of the lamination center opening 16. Concurrently, the outer sides 32 of the lamination are cut except for a side section 34, shown in a phantom line between the stations 20 and 24. At a final stamping station 36, the stator lamination 10 is blanked and separated from the sheet metal strip 12 along the side section 34.

Figure 3:
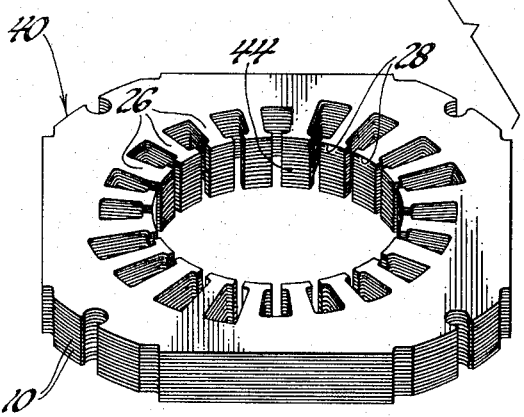
FIG. 3 illustrates a heat expandable cylindrical fixture aligned for insertion in an initially formed stator bore of a stack of stator laminations.

The stator laminations 10 pass from the final stamping station 36 to an assembling location where a series of the stator laminations 10 are stacked in axial registration on an arbor. A stack of stator laminations 40, illustrated in FIG. 3, is formed by a series of the stator laminations 10 which provides a predetermined stack height 42. The center openings 16 of the stator laminations 10 are axially aligned by the stacking operation and define an initially formed stator bore 44. The sides of the stator bore 44 are formed by the tooth tips 28. The stack of stator laminations 40 is fastened together by welding, or alternatively by interlocking projections provided in accordance with the aforementioned U.S. Pat. No. 3,202,851. The use of the aforementioned full hard silicon lamination steel material is especially desirable for fastening by means of the interlocking projections.

The fasteneing together of the stator laminations 10 into an integral body forms the stack of stator laminations 40 into a corresponding raw laminated stator core having a length corresponding to the stack height 42. A term raw stator core denotes a preliminary condition of a stator core following the fastening together of the stator laminations 10 and prior to heat treatment, coating and final finishing operations.

Figure 2:
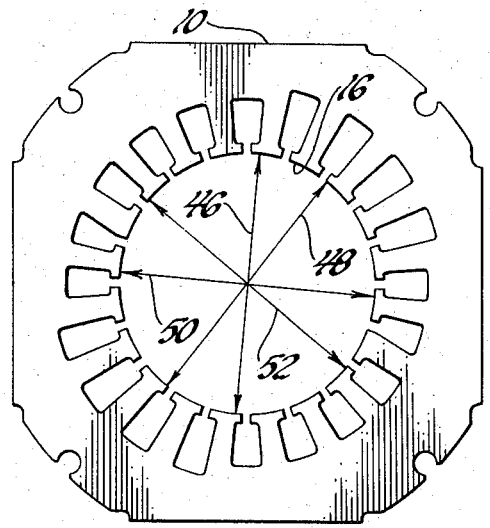
FIG. 2 illustrates an end view of a stator lamination included in a stack of stator laminations used to form a stator core made in accordance with the present invention.

Included in the manufacturing steps for fabricating the stack of stator laminations 40 into a finished laminated stator core, a bore finishing step which is the principal feature of this invention is required to form the initially formed stator bore 44 into a finished stator bore having specified maximum and minimum bore diameter dimensions. The bore size, also referred to as the internal diameter (I.D.) of a stator core, must be within the specified bore size along all diametrical bore axes. FIG. 2 illustrates an end view of a stator lamination 10 as may form the end of a series of the stator laminations 10 of a stack of stator laminations 40. Typical diametrical bore axes 46, 48, 50 and 52 are illustrated in FIG. 2 as being representative of several diametrical bore axes extending in a flat axial plane between diametrically opposite bore sides at circumferential spaced locations of the stator bore 44. Several diametrical bore axis measurements, generally in the order of twelve, are made so as to ascertain the amount and shape of bore size out-of-roundness occurring when the length of each diametrical bore axis is not within the specified maximum and minimum dimensions.

In many instances when the bore size of an initially formed stator bore 44 is measured along several of the bore diametrical axes, as represented by the axes 46, 48, 50 and 52, it has been noted that often there are undesired variations in the bore diameter size. It has been determined that these variations are not found in the center openings 16 of the laminations prior to separation of the stator lamination 10 from the shet metal strip 12. Some slight variations between different stator laminations are present due to some variation between different stamping dies or between different rolls of the stock sheet metal strip material. However, the chief variations appear following blanking of the stator lamination 10 at the stamping station 36, when the shape and size of the center opening 16 changes so as to become substantially out-of-round.

It is believed that stress is relieved or released upon separation of the stator lamination 10 from the sheet metal strip 12. These released stresses exceed the elastic limit of the sheet metal material and deform the stator lamination so that the center opening 16 changes. The direction of the grain axis of the material of the sheet metal strip 12 coincides with the longitudinal axis of the strip as it is fed through the stamping stations. The diametrical bore axis 50 is taken as generally aligned with the direction of the grain axis of the lamination material with the diametrical bore axis 46 taken as generally aligned with the direction of the cross-grain axis. The greatest changes or differences in a bore size generally appear at the orthogonally spaced diametrical bore axes 46 and 50. As noted further hereinbelow, the dimension along the diametrical axis 50 generally decreases while the dimension along the diametrical axis 46 increases following separation of the stator laminations 10 from the sheet metal strip 12. Some variation in the deformation of the lamination center openings 16 also occurs when the shape and location of the slots 22 is unsymmetrical.

Before describing the method of sizing the stator bore 44 as provided by this invention, it is noted that the raw stator cores are usually heat treated in furnaces during annealing and bluing processes. These processes are widely used and are well known to those skilled in the art of making laminated stator cores, as described briefly hereinafter. The annealing process enhances the magnetic characteristics of the stator core laminations 10 by heating in a controlled atmosphere at elevated temperatures. The bluing process forms oxide coatings on the sides of the laminations to improve their insulating properties by heating the stator core in another controlled atmosphere and usually at a different and lower elevated temperature than is used for annealing. Typically, the stator bore size must be provided with the desired finished bore dimension immediately following the heat treating processes.

To carry forth the method of this invention, a heat expandable cylindrical fixture 54, illustrated in FIG. 3, is used to form the desired finished bore size. The heat expandable fixture 54 is formed by a hollow cylindrical plug made of a stainless steel material selected from a family of austenitic nickel-chromium steels. One preferred stainless steel material which has been used successfully is A.I.S.I. specification 310 stainless steel. This stainless steel material has a substantially higher coefficient of thermal expansion, $9.7 \times 10^{-6}$ in./in./°F in the range of 70° to 1600° F, than the stator lamination material which is $6.5 \times 10^{-6}$ in./in. °F in the range of 70° to 1600° F.

A further important characteristic of the stainless steel material used to make heat expandable fixture 54 is that its strength is considerably higher at elevated temperatures than that of the lamination material. The thickness of the wall 56 of the heat expandable fixture 54 is in the order of one-fourth to one-half inch when used for stator bores having bore diameter sizes in a range approximately between 2½ to 4 inches. This allows the heat expandable fixture 54 to be made from commercially available stainless steel tubing materials. The outer circumference 58 forms the heat expanding working surface of the fixture 54 which is turned on a lathe to a predetermined circular dimension. As also noted further hereinbelow, the outer circumference 58 must have a maximum diameter smaller than the minimum diameter of the stator bore 44 and a minimum diameter determined so that, when both the stack of stator laminations 40 and the outer circumference 58 are thermally expanded, the outer circumference 58 expands sufficiently more than the stator bore 44. This provides an interference fit so as to develop sufficient radial forces against the tooth tips 28 to produce the desired bore sizing deformation. With the proper deformation, and following cooling of the stack of stator laminations 40 to ambient temperatures, the size of the stator bore 44 has the desired finished dimension which is held to close tolerances along each of the bore diametrical axes.

Figure 4:
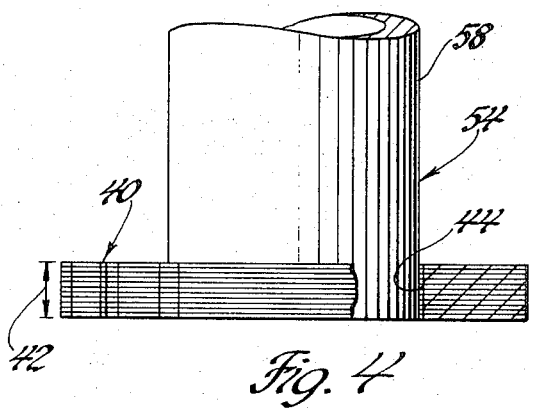
FIG. 4 illustrates the heat expandable cylindrical fixture and the stack of stator laminations shown in FIG. 3 assembled together in accordance with the method of this invention.

In practicing the present invention, the heat expandable fixture 54 is provided for insertion into the stator bore 44 of the stack of stator laminations 40. The heat expandable fixture 54 is inserted into the stator bore 44, as shown in FIG. 4. The assembled heat expandable fixture 54 and stack of stator laminations 40 is then placed in a furnace 64 illustrated in FIG. 5. The furnace 64 in one preferred embodiment is a roller hearth furnace used for the aforementioned heat treating processes. A pair of gas fired heat radiating tubes 66 are disposed above and below a support 68 including a series of rollers for passing the stack of stator laminations 40 through the furnace 64. Elevated temperatures in the order of 1400° to 1600° F. are developed in the stack of stator laminations in the furnace 64.

The assembled heat expandable fixture 54 and stack of stator laminations 40 may be placed in the furnace 64 prior to or after the annealing and bluing heat treatment processes noted hereinabove. However, since the elevated temperatures are in the same range as those used for these heat treatment processes, a preferred manner of performing this invention is to have the heat expandable fixture mounted in the stator bore 44 during the aforementioned annealing process. However, higher capacity furnaces for anneal heat treatment may be required since the additional material of the heat expandable fixture 54 requires additional heating capacity of an anneal heat treatment furnace.

In one specific example of the present invention, the furnace 64 heats the fixture 54 and stack of stator laminations 40 to an elevated temperature in the order of 1550° F. The outer circumference 58 of the heat expandable fixture 54 is expanded to form the initially formed out-of-round stator bore 44 to a finished size as described hereinafter with reference to FIGS. 6, 7 and 8.

The method of this invention has been employed successfully in sizing the stator bores of stator cores used in hermetically sealed motors rated between one-eighth to 5 horsepower and made for use in household appliances and refrigeration and air conditioner equipment. In the stator bores described herein, the bore sizes are specified as being out-of-round when there is a diameter variation of greater than two thousandths of an inch. In FIGS. 6, 7 and 8 graphs are illustrated for purposes of explanation in connection with the description of the bore sizing of a stack of stator laminations 40 for the stator core of a hermetic type motor having a specified stator bore size of 2.651 in. ±0.001 in. The initially formed stator bore following the die stamping and stacking steps, noted hereinabove, typically has out-of-round bore dimensions between 2.647 and 2.653 inches using laminations stamped from the aforementioned sheet steel material.

Illustrated in FIG. 6, are graphs of the curves of the bore diameter sizes along several diametrical bore axes as represented by the axes 46, 48, 50 and 52 at the ambient temperature of 70° F. and the elevated temperature of 1550° F. Also shown is the diameter size of the outer circumference 58 of the heat expandable fixture 54 at the ambient temperature of 70° F. and at the elevated temperature of 1550° F. The lower curve 70 illustrates the diameter of the outer circumference 58 of the heat expandable fixture 54 at ambient temperature. This diameter dimension must be smaller than the minimum bore diameter so that ther is a clearance fit for inserting the fixture 54 therein. In the specific example, the diameter of the outer circumference 58 is 2.6435, however, a diameter of 2.6425 was also used successfully. These dimensions were determined empirically by experimentally testing various fixture sizes.

The curve 72 in FIG. 6 illustrates the diameter size of the outer circumference 58 when it is thermally expanded by being heated alone to the elevated temperature of 1550° F. and outside of the stack of stator laminations 40. The difference in heights of the curves 70 and 72 indicated by the line 73 illustrates the amount of thermal expansion. In the specific example the diameter of the outer circumference 58 expanded 0.039 inch. It is also to be noted that the curves 70 and 72 are substantially straight indicating the circular or constant diameter around the outer circumference 58 of the heat expandable fixture 54.

The curves 74, 76 and 78 between the curves 70 and 72 indicate the bore diameter sizes of the stator bore 44. The curve 74 illustrates the bore diameter sizes of the initially formed out-of-round stator bore 44 at ambient temperature. The curve 74 indicates that the oval out-of-round shape that is usually formed by the lamination center openings 16 when the stator laminations 10 are initially stacked. In the specific example, the variation in the heights of the curve 74 is 0.006 inch. Often the variation in the bore diameter size may be 0.008 to 0.009 inch. The curve 76 shows the diameter sizes of the stator bore 44 after it is expanded at the elevated temperature of 1550° F. without the heat expandable fixture 54 being inserted therein. It is to be noted that the expanded size of the stator bore 44 has substantially the same out-of-round contour at the elevated temperature as indicated by the similarity in the shapes of the curves 74 and 76.

The difference in heights of the curves 74 and 76, indicated by the line 77 in FIG. 6, illustrates the amount of the thermal expansion of the stator bore 44 which is somewhat less than the expansion of the heat expandable fixture 54. In the specific example the stator bore size expanded 0.025 inch so that there was a difference of 0.014 inch in the expansions of the stator bore size and the fixture size. The interference fit between the fixture 54 and the sides of the stator bore 44 develops the desired stresses for deforming the bore. The curve 78 illustrates the finished bore size at ambient temperature following the bore sizing method of this invention.

Figure 5:
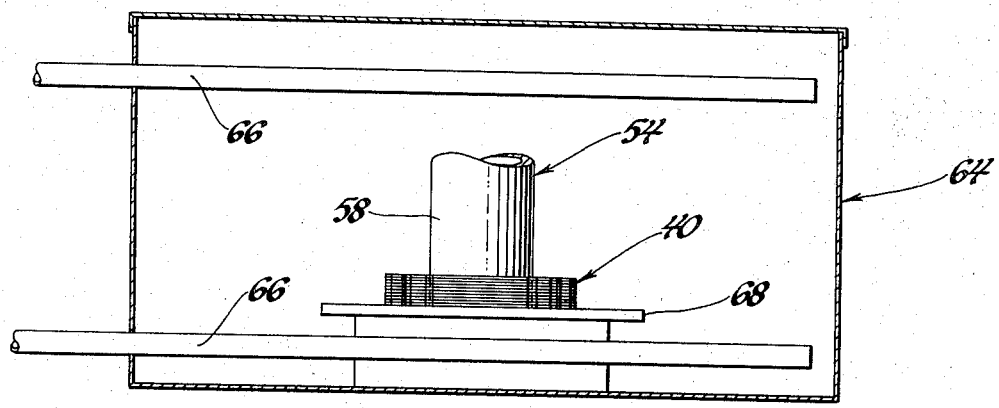
FIG. 5 illustrates the assembly of FIG. 4 in a furnace for heating to elevated temperatures.

As the heat expandable fixture 54 and stack of stator laminations are heated together, as shown in FIG. 5, the outer circumference 58 of the heat expandable fixture 54 expands uniformly and forces radially outward against the tooth tips 28 of the stator teeth 26. The expansion develops high internal stresses within each of the stator laminations 10 of the stack of stator laminations 40. In FIG. 7 there is shown a representative stress versus temperature curve 80 for the stator laminations 10 as they undergo the stresses developed by the heat expandable fixture 54. Approximately midway between ambient temperature and the elevated temperature of 1550° F. the heat expandable fixture begins to exert radial forces against the tooth tips 28. The stress initially developed is within the elastic deformation range of the lamination material as indicated by the linear or straight line portion of the curve 80. When the stress exceeds the elastic limit of the lamination material, the yield stress point 82 is reached, as indicated in the graph, and inelastic deformation occurs. This inelastic or plastic deformation continues as the temperature of the heat expandable fixture 54 and stack or stator laminations 40 increases to the elevated temperature of 1550° F.

The increasing difference in the expansion by the heat expandable fixture 54 develops increasing radial force on the stator bore 44 so as to press the tooth tips 28 into conformity with the outer circumference 58 of the fixture 54. The decrease in stress shown in the aforementioned FIG. 7 with increasing temperature and, accordingly, increasing radial force from the heat expandable fixture 54, indicates the plastic deformation which takes place in the stator laminations 10. The stainless steel fixture material is within its elastic limit throughout the temperature range to 1550° F. so that little or no permanent deformation occurs therein. For this reason the heat expandable fixture 54 may be re-used without any change in its dimensional characteristics. Also, deformation of the stator bore 44 by the fixture in the elastic deformation range of the stator laminations is not retained in the finished stator bore.

After heating to the elevated temperature of 1550° F. the stack of stator laminations 40 with the heat expandable fixture 54 is removed from the furnace 64 and cooled to ambient temperature. The desired finish bore size is then provided in the stator bore 44. In the specific example noted, the finished bore diameter sizes have a maximum variation of two thousandths of an inch from the desired bore diameter size. Since the heat expandable fixture 54 contracts to its original size, it is easily removed from the stator bore 44.

In FIG. 8, the line 84 illustrates the outline of the finished stator bore after forming by the method of the present invention and the line 86 illustrates the outline of the initially formed out-of-round stator bore 44. The heat expandable fixture 54 is shown in the center of the lines 84 and 86. The lines 84 and 86 in FIG. 8 correspond to the curves 78 and 74, respectively, in FIG. 6 and line 86 is exaggerated for purposes of illustrating the outline of the bore out-of-roundness. Accordingly, the outer circumference 58 of the heat expandable fixture 54 is represented by curve 70 in FIG. 6, as noted hereinabove.

The line 86 indicates the ovality of the stator bore 44, as it is initially formed. The bore is flattened along the diametrical bore axis 50, which coincides with the direction of the grain axis of the lamination material and is indicated by arrow 88. The bore is elongated along the diametrical bore axis 46 coinciding with the direction of the cross grain axis, indicated by the arrow 90. Accordingly, when the heat expandable fixture 54 is heated within the stator bore 44, high tensile stresses are developed in the radial areas of the stator laminations 10 shown in FIG. 2 around the extended ends of the diametrical bore axis 50 while high compressive stresses are developed in the stator laminations 10 around the extended ends of the diametrical axis 46. This causes the right-hand and left-hand areas of each stator lamination 10 as viewed in FIG. 2, to be pressed radially outwardly while the top and bottom areas, as also viewed in FIG. 2, are forced radially inward in a stretching deformation.

In the finished stator bore, the length of the initially formed diametrical bore axis 50 will be elongated while the length of the initially formed diametrical bore axis 46 will be shortened from their original lengths. This change, caused by the deformation, is shown in FIG. 6 by the center portion of the curve 78 being lower than the curve 74 while the opposite ends of the curve 78 are higher than the ends of the curve 74. In the general vicinity of the extended ends of the diametrical bore axes 48 and 52 the initially formed out-of-round stator bore and the finished stator bore are substantially identical as is indicated by the intersections 92 and 94 of the curves 74 and 78. These correspond to the four intersections designated 96 of lines 84 and 86 in FIG. 8. Accordingly, there is substantially neutral stress developed in the stator laminations 10 around the extended ends of the diametrical bore axes 48 and 52 as the stresses change in character from tensile to compressive stress, to tensile stress and then again from tensile to compressive stress around the circumference of the tooth tips 28 during the sizing deformation. As indicated by the curve 78 in FIG. 6 and the line 84 in FIG. 8, the finished stator bore formed in the stack of stator laminations 40 is substantially constant around the circumference of the bore and within the specified bore diameter size tolerances. Further, any marginal variations between the tooth tips 28 are corrected so that they flush and are in finished alignment.

While the embodiment of the present invention for a method of providing finished bore sizes in a stack of stator laminations constitutes a preferred form, it is understood that other forms may be adopted without departing from the spirit of this invention.

What is claimed is:

1. A method for forming finished bore sizes in laminated stator cores of dynamoelectric machines, the steps comprising: forming a plurality of magnetizable stator laminations with a circumferential series of radially inwardly extending teeth terminating in tooth tips defining a center opening; axially aligning said plurality of stator laminations to form a stack of stator laminations with said tooth tips defining an initially formed out-of-round stator bore; inserting a heat expandable cylindrical fixture into said stator bore wherein said fixture has an outer diameter size having a predetermined clearance fit with said stator bore, said fixture being formed of a material having a thermal expansion characteristic greater than the thermal expansion characteristic of said stator laminations, and the fixture material further having a higher yield strength than that of said stator laminations in a predetermined range of elevated temperatures; heating said heat expandable fixture and said stator laminations to a temperature within said predetermined range of elevated temperatures to radially outwardly expand said fixture substantially more than said tooth tips thereby developing an interference fitting relationship between said tooth tips and said fixture and for outwardly yielding said tooth tips for deforming said out-of-round stator bore into conformity with the outer diameter of said fixture and establishing a finished stator bore such that the finished stator bore has a desired diameter size with substantially reduced diameter size variations from that of said initially formed out-of-round stator bore.

2. A method for forming finished bore sizes in laminated stator cores of dynamoelectric machines, the steps comprising: punching a plurality of stator laminations from a strip of lamination steel material with said stator laminations including a circumferential series of teeth terminating in tooth tips defining a center opening; axially aligning said plurality of stator laminations in a stack of stator laminations with said tooth tips in axial registration for initially forming an out-of-round stator bore; providing a heat expandable cylindrical fixture including a predetermined outer diameter size less than the minimum diameter size of said stator bore, said fixture being formed of a metal material having a coefficient of thermal expansion greater than said stator laminations and a yield strength characteristic higher than that of said stator laminations in a predetermined range of elevated temperatures; annealing said stator laminations with said fixture inserted in said out-of-round stator bore wherein said stator laminations are heated to a predetermined temperature within said predetermined range of elevated temperatures; concurrently heating said fixture to said predetermined temperature during said annealing of stator laminations for radially outwardly expanding said fixture to provide an interference fitting relationship with said tooth tips thereby producing radial forces pressing said tooth tips into conformity with said outer diameter of said fixture and developing yield stresses in said stator laminations such that said out-of-round stator bore is permanently deformed to establish a desired finished stator bore size upon cooling to ambient temperatures wherein the finished stator bore has substantially reduced diameter size variations from that of the initially formed out-of-round stator bore.

3. A method for forming finished bore sizes in laminated stator cores of dynamoelectric machines, the steps comprising: die stamping a plurality of stator laminations from a sheet metal strip made from a full-hard silicon lamination steel material with said stator laminations including a circumferential series of radially inwardly extending teeth terminating in tooth tips defining a center opening; axially aligning said plurality of stator laminations to form a stack of stator laminations having a predetermined height for forming one of said stator cores with said tooth tips defining an initially formed out-of-round stator bore; inserting a heat expandable fixture made from a hollow plug of a stainless steel material into said stator bore wherein said plug has an outer diameter size having a predetermined clearance fit with said tooth tips, said stainless steel material including one of a group of materials of an austenetic nickel-chromium type steel having a thermal expansion characteristic greater than the thermal expansion characteristic of said stator laminations, and further having a yield strength higher than that of said stator laminations in a predetermined range of elevated temperatures between 1400° to 1600° F.; heating said heat expandable fixture and said stator laminations to a temperature within said predetermined range of elevated temperatures to radially outwardly expand said fixture substantially more than said tooth tips thereby developing an interference fitting relationship between said tooth tips and said fixture and outwardly yielding said tooth tips for inelastically deforming said out-of-round stator bore into conformity with said outer diameter of said fixture and for establishing a finished stator bore such that said finished stator bore has a desired diameter size with substantially reduced diameter size variations from that of said initially formed out-of-round stator bore.

4. A method for forming finished bore sizes in laminated stator cores of dynamoelectric machines, the steps comprising: forming a plurality of stator laminations from a sheet metal strip of lamination steel material with said stator laminations including a circumferential series of slots forming radially inwardly extending teeth terminating in tooth tips defining a center opening; aligning said plurality of stator laminations in axial registration to form a stack of stator laminations having a predetermined height; fastening said plurality of stator laminations together to form one of said laminated stator cores wherein said tooth tips define an initially formed out-of-round stator bore including bore diameter size variations of 0.006 to 0.008 inch; inserting a heat expandable fixture made from a hollow plug of a stainless steel material into said out-of-round stator bore wherein said plug has a wall thickness in the order of one-half inch and an outer diameter size having a predetermined clearance fit with said tooth tips, said stainless steel material being one of a group of stainless steel materials of the austenetic nickel-chromium type having a thermal expansion characteristic substantially greater than the thermal expansion characteristic of said stator laminations, and further having a yield strength substantially higher than that of said stator laminations in a predetermined range of elevated temperatures between 1400° to 1600° F.; heating said heat expandable fixture and said stator laminations to a temperature within said predetermined range of elevated temperatures to concurrently anneal said stator laminations and radially outwardly expand said fixture substantially more than said tooth tips thereby developing an interference fitting relationship between said tooth tips and said fixture and for producing yield stresses in said stator laminations and permanently deforming said out-of-round stator bore into conformity with the outer diameter of said fixture thereby establishing a finished stator bore size upon cooling to ambient temperatures wherein the finished stator bore size includes maximum bore diameter size variations of 0.002 inch or less.

* * * * *